(12) United States Patent
Kim et al.

(10) Patent No.: US 9,691,297 B2
(45) Date of Patent: Jun. 27, 2017

(54) WEIGHT BALANCING TYPE DYNAMIC YAWING SIMULATOR

(71) Applicant: Koreatesting Co., Ltd., Daejeon (KR)

(72) Inventors: Hyoung Eui Kim, Daejeon (KR); Hyoung Joon Kim, Daejeon (KR); Hyoung Min Kim, Daejeon (KR)

(73) Assignee: Koreatesting Co., Ltd., Daejeon (KR)

( * ) Notice: Subject to any disclaimer, the term of this patent is extended or adjusted under 35 U.S.C. 154(b) by 222 days.

(21) Appl. No.: 14/718,966

(22) Filed: May 21, 2015

(65) Prior Publication Data

US 2016/0042663 A1 Feb. 11, 2016

(30) Foreign Application Priority Data

Aug. 8, 2014 (KR) .......................... 10-2014-0102509

(51) Int. Cl.
| | | |
|---|---|---|
| G01M 7/00 | (2006.01) | |
| G09B 19/14 | (2006.01) | |
| G09B 9/04 | (2006.01) | |
| G09B 19/16 | (2006.01) | |

(52) U.S. Cl.
CPC ............... *G09B 19/14* (2013.01); *G09B 9/04* (2013.01); *G09B 19/167* (2013.01)

(58) Field of Classification Search
CPC .......... G09B 19/14; G09B 9/04; G01M 7/08; G01M 17/04; B25D 9/005; G01L 23/00; G01L 3/24
USPC ............... 73/12.01, 11.01, 11.04, 35.14, 862
See application file for complete search history.

(56) References Cited

U.S. PATENT DOCUMENTS

| | | | |
|---|---|---|---|
| 5,189,920 A | 3/1993 | Martinez | |
| 5,623,094 A * | 4/1997 | Song | G01M 7/08 73/12.04 |
| 6,655,202 B2 * | 12/2003 | Potts | G01L 5/0009 701/37 |
| 7,832,762 B2 * | 11/2010 | Breed | B60R 21/013 280/728.1 |
| 2003/0182025 A1 * | 9/2003 | Tseng | B60G 17/0162 701/1 |
| 2009/0295176 A1 * | 12/2009 | Matsubara | B60R 19/40 293/132 |

FOREIGN PATENT DOCUMENTS

| | | |
|---|---|---|
| KR | 2019980029254 U | 8/1998 |
| KR | 1020040017666 A | 2/2004 |
| KR | 1020090039459 A | 4/2009 |
| KR | 1020110093674 A | 8/2011 |

* cited by examiner

*Primary Examiner* — Lisa Caputo
*Assistant Examiner* — Nigel Plumb
(74) *Attorney, Agent, or Firm* — The Webb Law Firm

(57) ABSTRACT

Provided is a weight balancing type dynamic yawing simulator, and more particularly, a weight balancing type dynamic yawing simulator capable of reproducing real crash situations and preventing a weight from leaning to one side by providing a simulator capable of reproducing crash results of a side direction and yawing to the existing simulator capable of reproducing crash results of a front direction, pitching, and a vertical direction of a vehicle, by providing a dynamic yawing simulator of a pitching and yawing composite safety apparatus type capable of reproducing crash results due to a side direction and yawing in a crash simulator for a vehicle, thereby preventing the simulator apparatus from being separated and broken.

10 Claims, 6 Drawing Sheets

WEIGHT BALANCING TYPE DYNAMIC YAWING SIMULATOR

CROSS-REFERENCE TO RELATED APPLICATION

This application claims priority under 35 U.S.C. §119 to Korean Patent Application No. 10-2014-0102509, filed on Aug. 8, 2014, in the Korean Intellectual Property Office, the disclosure of which is incorporated herein by reference in its entirety.

TECHNICAL FIELD

The following invention relates to a weight balancing type dynamic yawing simulator, and more particularly, to a weight balancing type dynamic yawing simulator capable of reproducing crash results due to a side direction and yawing in a crash simulator for a vehicle.

BACKGROUND

To confirm safety of a vehicle, automobile companies and research institutes perform a safety test. In particular, researches for minimizing bad effects on passengers by simulating situations occurring due to a collision accident of a vehicle in advance have been actively conducted.

As a plan of the research, a crash test process for testing how passengers are affected at the time of the occurrence of a safety accident is essentially performed when car makers develop new cars.

In the crash test process, a dummy is generally placed inside a vehicle which is an object of a crash test and then collides with a crash member, and the like at various speeds, and as a result a shock applied to the dummy is measured by a meter such as a sensor or is photographed as an image to be analyzed.

However, the crash test process is accompanied by a long preparation process due to the preparation of a plurality of actual vehicles meeting speed conditions for testing, the preparation of dummies meeting conditions in vehicles, and the like and therefore is quite expensive to use vehicles for the tests, in addition to a long investment period. As a result, the crash test process may cause temporal and human losses.

To solve the above problem, a crash test of a vehicle is performed by installing an actuator for test and applying an accelerating force generated by a pressure fluid to a simulator through a piston and a rod within the actuator.

The crash test simulator is performed under the reproduction environment similar to the actually tested vehicle, which has advantages of more saving costs and the preparation time for simulation than the case of using the actually tested vehicle.

Korean Patent Laid-Open Publication No. 10-2004-0017666 (Published on Feb. 27, 2004 entitled "Crash Test Apparatus For Vehicle") proposes a simulator for reproducing a phenomenon of pitching and a vertical direction along with a front direction.

However, a head-on crash and a head-on crash at about 20% of a front portion of a vehicle occur in reality and thus a vehicle body rotates as soon as the crash occurs, such that a passenger may be primarily shocked by an airbag and his/her neck may be broken to be seriously injured or even deadly.

However, the existing simulator as described above is hard to reproduce the above situations and thus it is proved that the above situations are different from actual crash experiment results.

That is, the existing simulator does not reproduce the crash situation of a side direction and yawing and thus may not reproduce the actual situations that the passenger crashes with the airbag and his/her neck is broken.

Therefore, there is a need for a simulator which may reproduce the crash results of the side direction and the yawing in addition to the front direction, pitching, and vertical direction phenomena which are described above.

Further, the test apparatus rotates in one direction at a rapid speed and therefore the gravity of weight thereof leans to one side during a test for reproducing the crash results of the side direction and the yawing and therefore may be separated or broken. As a result, a solution to the problem is required.

RELATED ART DOCUMENT

Patent Document (Patent Document 1) Korean Patent Laid-Open Publication No. 10-2004-0017666 (Published on Feb. 27, 2004 entitled "Crash Test Apparatus For Vehicle")

SUMMARY

An embodiment of the present invention is directed to providing a weight balancing type dynamic yawing simulator capable of reproducing real crash situations by providing a simulator capable of reproducing crash results of a side direction and yawing to the existing simulator capable of reproducing crash results of a front direction, pitching, and a vertical direction of a vehicle.

Another embodiment of the present invention is directed to providing a weight balancing type dynamic yawing simulator capable of helping develop passenger safety apparatuses such as a seat and a seat belt by verifying a strength of injury due to a shock by reproducing crash results of a side direction and yawing.

Still another embodiment of the present invention is directed to providing a weight balancing type dynamic yawing simulator capable of reproducing crash results by being applied to a vehicle crash field and various fields such as vehicle parts crash, a building structure, and a ship.

Yet another embodiment of the present invention is directed to providing a weight balancing type dynamic yawing simulator capable of preventing a test apparatus from being separated or broken due to a weight concentration in one direction due to a crash test in a vehicle crash simulator.

In one general aspect, a weight balancing type dynamic yawing simulator includes: a basic part formed at a lower portion thereof; and a body formed at an upper portion of the basic part and moving and rotating by an external shock, wherein the body includes: a rotation center part configured to be formed on a lower surface of the body and spaced apart from one side in a length direction of the body at a predetermined distance; a rotating part spaced apart from the rotation center part toward the other side in the length direction of the body at a predetermined distance; and a moving part configured to be formed at one side of the body and move on the basic part, and the basic part includes: a rotation center servo actuator configured to be formed at one side of the upper portion of the basic part and apply an accelerating force to the rotation center part in a width direction of the body; and a rotation servo actuator configured to be spaced apart from the rotation center servo actuator toward the other side in the length direction of the basic part at a predetermined distance and apply the accelerating force to the rotating part in the width direction of the body.

The basic part may further include: a pair of rails configured to be formed on an upper surface of the basic part to be parallel with a direction in which the rotation servo actuator applies the accelerating force and have the rotating part moving therealong.

The rotating part may include: a rotating part body configured to be applied with the accelerating force from the rotation servo actuator and move along the rail; a rotating part body rail configured to be formed at both ends of the upper portion of the rotating part body; rotation moving parts configured to be formed on the rotating part body in a half ring shape while being curved to face each other and to be movable in a circumferential direction by a predetermined distance while being fixed to the rotating part body rail; and a rotation moving cover part configured to be formed on an upper surface of the rotation moving part and be connected to the body.

The rotation moving part may include: rotation moving limiting parts provided at both ends thereof to limit a movement in the circumferential direction.

The basic part may further include: a weight balancing part configured to be formed on the other side of the basic part to be movable in the width direction of the body.

The weight balancing part may include: a weight balancing fixed part configured to be fixed on the upper surface of the basic part; a weight balancing fixed shaft configured to include a weight balancing rod formed to be connected to the weight balancing fixed part in the width direction of the body and a weight balancing piston formed to be connected to the weight balancing rod; and a weight balancing body configured to enclose the weight balancing fixed shaft, and the weight balancing body may be formed to be stroke-driven in the width direction of the body by an air pressure.

The basic part may further include: a weight balancing rail configured to be formed on the upper portion of the basic part in the width direction of the body and have the weight balancing body moving therealong.

The basic part may further include: a buffer member configured to be formed on the upper surface of the basic part in the width direction of the body and formed to contact the rotating part.

The weight balancing type dynamic yawing simulator may further include: an actuator pneumatic supplier configured to be formed on the upper surface of the basic part and supply the air pressure to the rotation center servo actuator and the rotation servo actuator.

The weight balancing type dynamic yawing simulator may further include: a weight balancing pneumatic supplier configured to be formed on the upper surface of the basic part and supply the air pressure to the weight balancing part.

Other features and aspects will be apparent from the following detailed description, the drawings, and the claims.

DETAILED DESCRIPTION OF MAIN ELEMENTS

Figure 1:
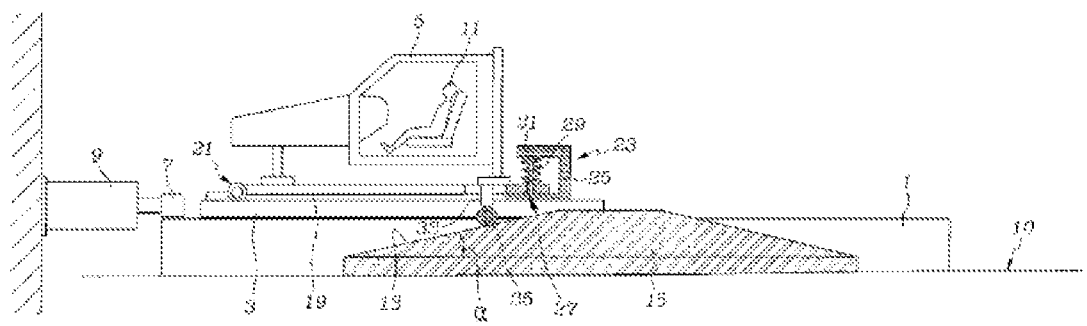
FIG. 1 is a diagram illustrating a vehicle crash simulator according to the related art.

100: Basic part
110: Rotation center servo actuator
120: Rotation servo actuator
130: Rail
140: Weight balancing part
141: Weight balancing fixed part
142: Weight balancing fixed shaft
142-1: Weight balancing rod
142-2: Weight balancing piston
143: Weight balancing body
144: Weight balancing rail
145: Cushion part
150: Buffer member
160: Actuator pneumatic supplier
170: Weight balancing pneumatic supplier
200: Body
210: Rotation center part
220: Rotating part
221: Rotating part body
222: Rotation moving part
223: Rotation moving cover part

DETAILED DESCRIPTION OF EMBODIMENTS

Hereinafter, a weight balancing type dynamic yawing simulator according to an exemplary embodiment of the present invention having the above-mentioned characteristics will be described in more detail with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Figure 2:
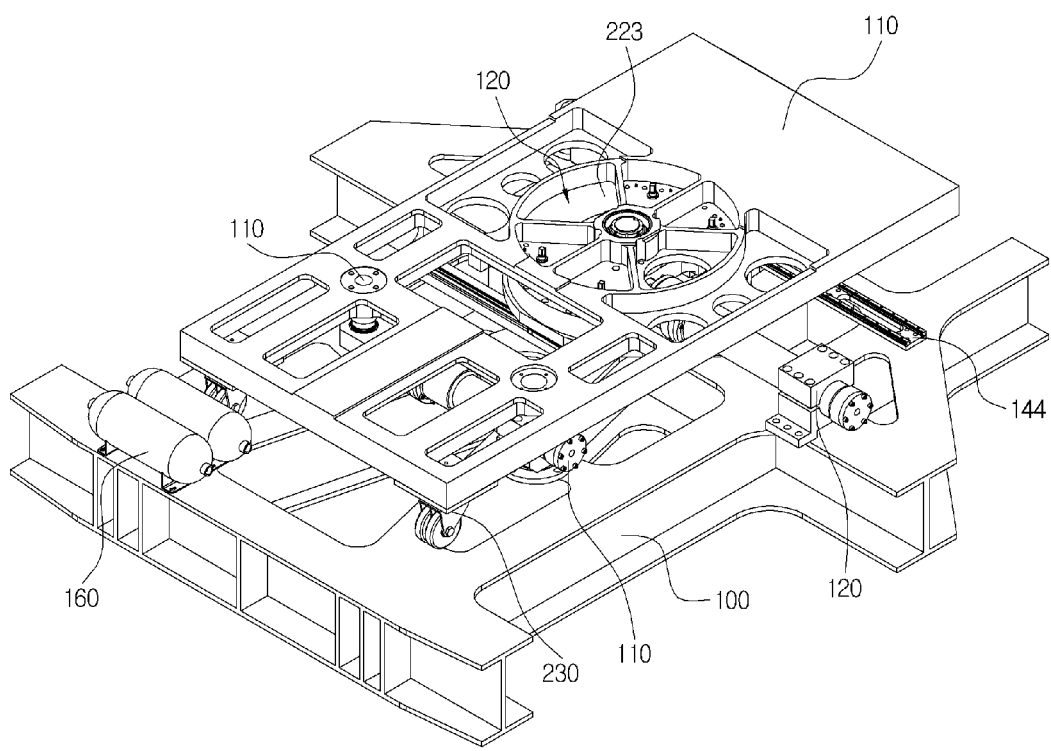
FIG. 2 is a diagram illustrating a weight balancing type dynamic yawing simulator according to an exemplary embodiment of the present invention.
Figure 3:
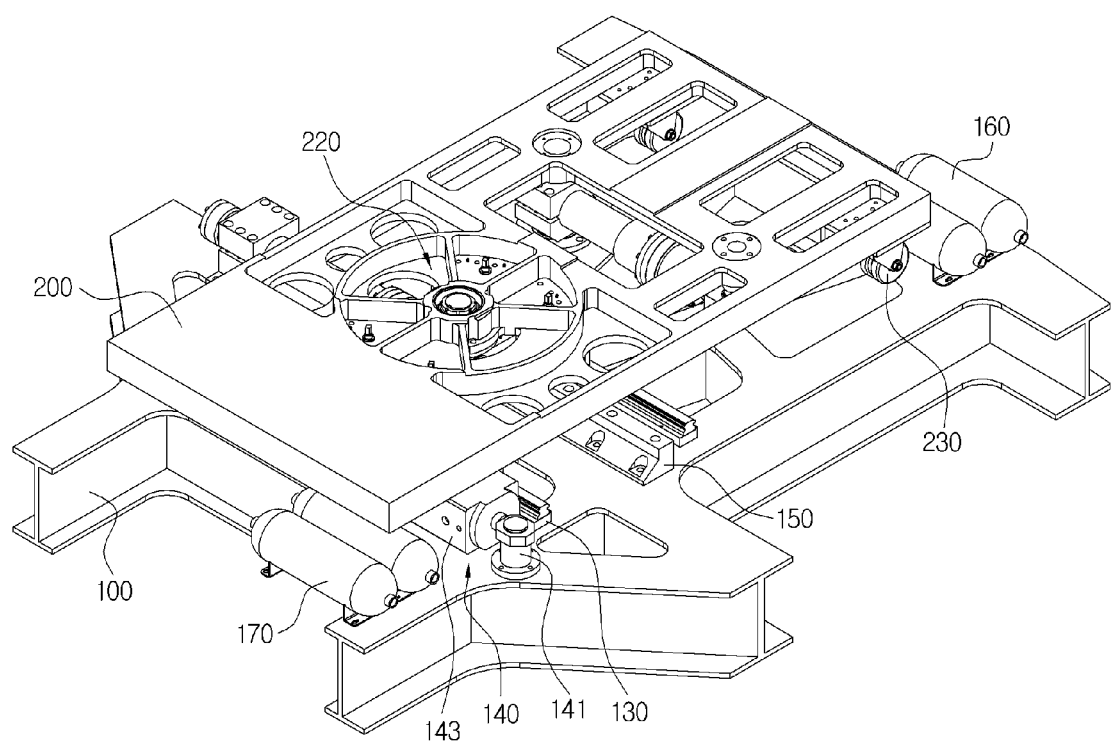
FIG. 3 is another diagram illustrating the weight balancing type dynamic yawing simulator according to the exemplary embodiment of the present invention (form in which the simulator of FIG. 2 rotates by 180°).
Figure 4:
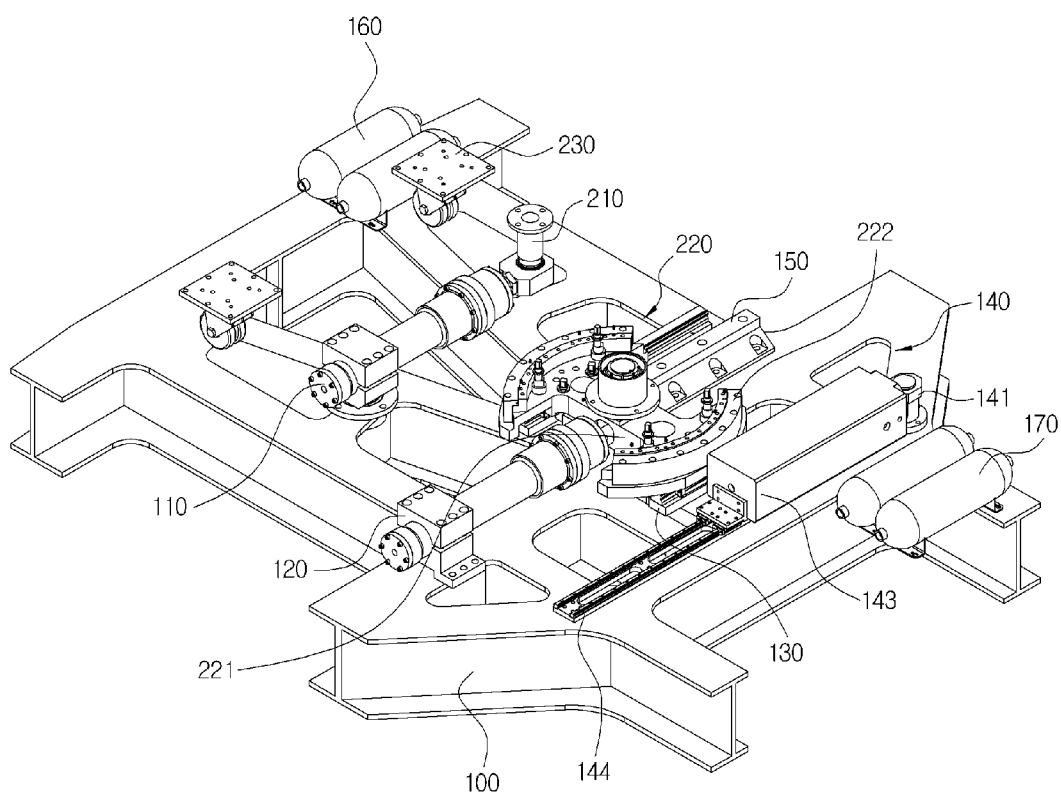
FIG. 4 is a diagram illustrating in detail the weight balancing type dynamic yawing simulator according to the exemplary embodiment of the present invention (simulator for a left crash of a front bumper of a vehicle).
Figure 5:
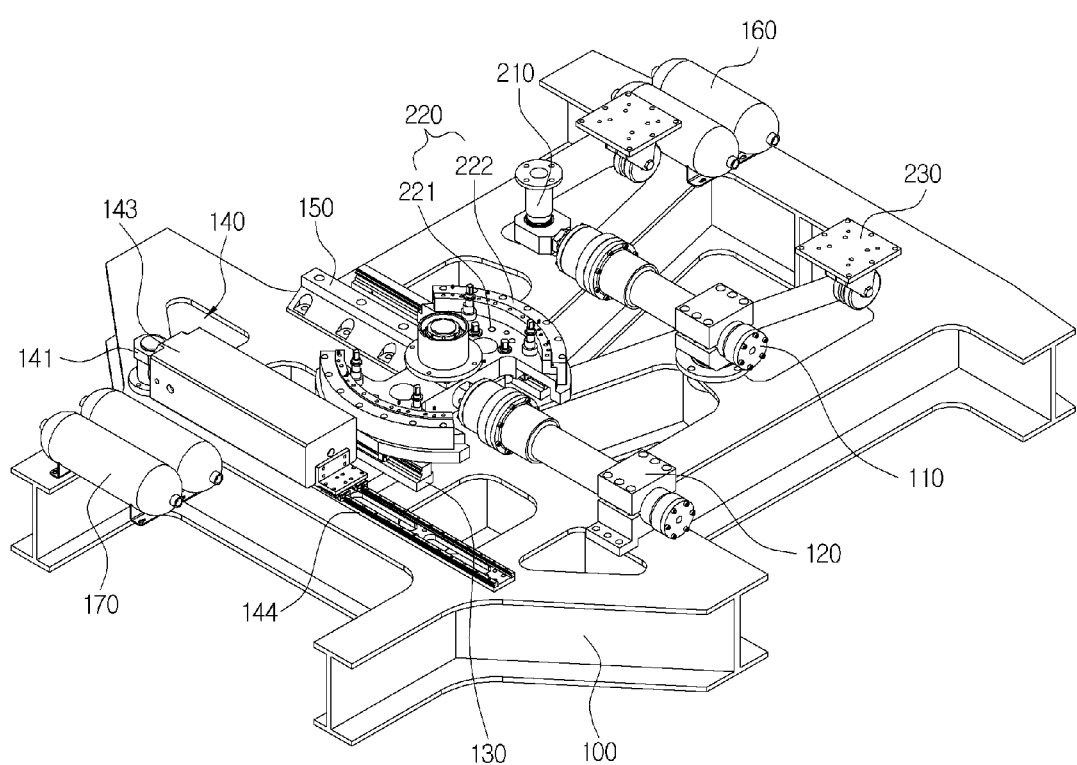
FIG. 5 is another diagram illustrating in detail the weight balancing type dynamic yawing simulator according to the exemplary embodiment of the present invention (simulator for a right crash of the front bumper of the vehicle).
Figure 6A:
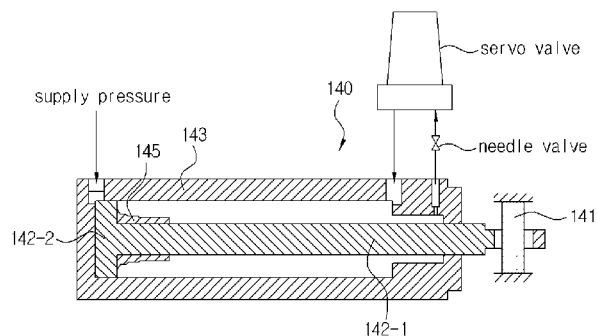
FIGS. 6a-c are diagrams illustrating a weight balancing part of the weight balancing type dynamic yawing simulator according to the exemplary embodiment of the present invention.
Figure 6B:
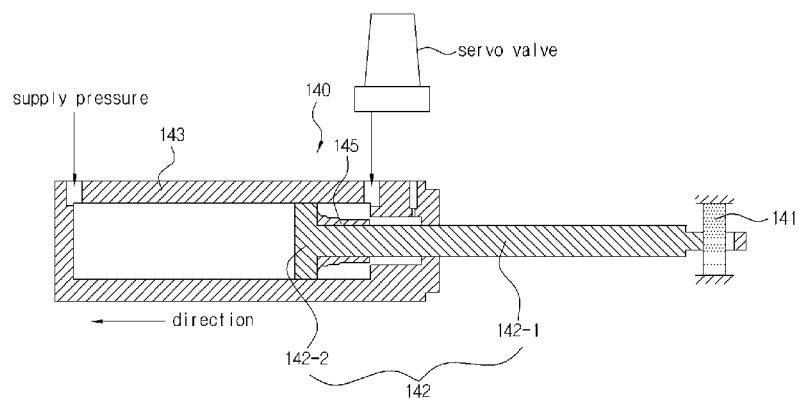
Figure 6C:
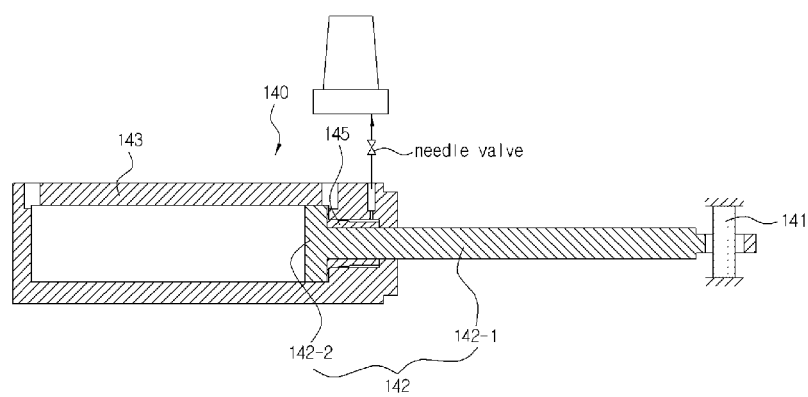
Figure 7A:
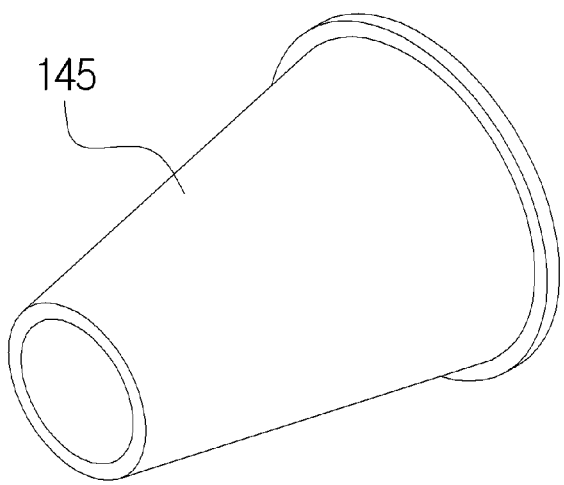
FIGS. 7a-b are diagrams illustrating an example of the weight balancing part of the weight balancing type dynamic yawing simulator according to the exemplary embodiment of the present invention (diagram illustrating a cushion part).
Figure 7B:
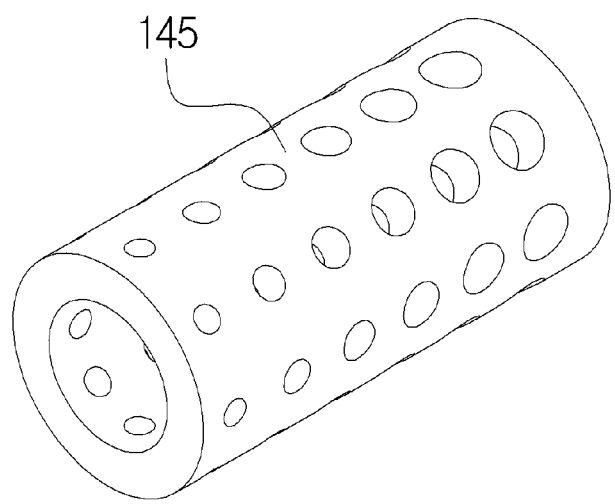

FIG. 1 is a diagram illustrating a vehicle crash simulator according to the related art; FIG. 2 is a diagram illustrating a weight balancing type dynamic yawing simulator according to an exemplary embodiment of the present invention; FIG. 3 is another diagram illustrating the weight balancing type dynamic yawing simulator according to the exemplary embodiment of the present invention (form in which the simulator of FIG. 2 rotates by 180°); FIG. 4 is a diagram illustrating in detail the weight balancing type dynamic yawing simulator according to the exemplary embodiment of the present invention (simulator for a left crash of a front bumper of a vehicle); FIG. 5 is another diagram illustrating in detail the weight balancing type dynamic yawing simulator according to the exemplary embodiment of the present invention (simulator for a right crash of the front bumper of the vehicle); FIG. 6 is a diagram illustrating a weight balancing part of the weight balancing type dynamic yawing simulator according to the exemplary embodiment of the present invention; and FIG. 7 is a diagram illustrating an example of the weight balancing part of the weight balancing type dynamic yawing simulator according to the exemplary embodiment of the present invention (diagram illustrating a cushion part).

As illustrated in FIGS. 2 to 5, the weight balancing type dynamic yawing simulator according to the exemplary embodiment of the present invention is a simulator including a basic part 100 which is formed at a lower portion thereof and a body 200 which is formed at an upper portion of the basic part 100 and moves or rotates by an external shock (accelerating force by an actuator).

An upper surface of the body 200 is a portion which a vehicle model equipped with a dummy, etc., an intrusion test simulator (intrusion device), and the like are installed. For this reason, components such as the existing pitching simulator, etc., are installed at an outside of a simulator to reproduce crash situations.

On the other hand, there is a difference in that the weight balancing type dynamic yawing simulator according to the exemplary embodiment of the present invention is installed on a lower surface of the body 200 or in the basic part 100.

This has an advantage in that a separate space for installing the components such as the simulator is not required.

A lower surface of the body 200 is provided with a rotation center part 210, a rotating part 220, and a moving part 230, and the like.

The rotation center part 210 is formed on the lower surface of the body 200 and is spaced apart from one side in a length direction of the body 200 at a predetermined distance.

In this case, the one side in the length direction of the body 200 is a portion to which the accelerating force due to the shock is applied, that is, a front portion of the vehicle and the other side in the length direction of the body 200 is a rear portion of the vehicle.

In other words, the weight balancing type dynamic yawing simulator according to the exemplary embodiment of the present invention is a simulator for reproducing situations that about 20% of the one side (front surface of a vehicle) in the length direction of the body 200 head-on crashes with obstacles and thus the other side (rear surface of a vehicle) in the length direction of the body 200 moves and rotates based on the rotating shaft due to the shock.

Further, the weight balancing type dynamic yawing simulator according to the exemplary embodiment of the present invention may reproduce crash results in a side direction in which a shock is applied to a side of the vehicle (width direction of the body 200 in the present invention), in addition to the head-on crash of the one side in the length direction of the body 200.

The rotating part 220 is spaced apart from the rotation center part 210 toward the other side in the length direction of the body 200 at a predetermined distance.

The moving part 230 is formed at one side of the body 200 and the body 200 which moves or rotates by the crash is formed to move and rotate on the basic part 100.

In this case, the moving part 230 may be provided in one or in plural for a balance and as the moving part 230, a roller made of a steel material is generally preferable but the present invention is not limited thereto and therefore various exemplary embodiments may be possible.

However, to prevent the simulator from being separated or damaged due to the driving of the weight balancing type dynamic yawing simulator according to the exemplary embodiment of the present invention or the shock transferred under situations that the weight balancing type dynamic yawing simulator performs simulation along with other pitching simulators, etc., the weight balancing type dynamic yawing simulator is preferable to include a roller having a strength enough to bear the load of the body 200 due to the shock and a proper number.

Further, to reproduce the situation that the moving part 230 is yawed due to the crash of the vehicle, the moving part 230 may be formed to be tilted by a predetermined angle to move in a circumferential direction and may be a roller of which the direction varies by the rotation of the body 200 depending on the operation of the actuator.

The basic part 100 includes a rotation center servo actuator 110, a rotation servo actuator 120, etc., which apply an accelerating force for movement due to the yawing of the body 200 or the shock in the side direction.

The rotation center servo actuator 110 is formed at one side of the upper portion of the basic part 100 and the rotation center part 210 and the rod of the rotation center servo actuator 110 are formed on the same line to apply the accelerating force to the rotation center part 210 in a width direction of the body 200.

The rotation servo actuator 120 is formed to be spaced apart from the rotation center servo actuator 110 toward the other side in the length direction of the basic part 100 at a predetermined distance and the rotating part 220 and the rod of the rotation servo actuator 120 are formed on the same line to apply the accelerating force to the rotating part 220 in the width direction of the body 200.

The rotation center servo actuator 110 and the rotation servo actuator 120 are formed as the servo actuator. In this case, a braking system which is provided in the body of the servo actuator and is similar to the brake pad of the vehicle may brake the rod which is progressed in a stroke direction at a more rapid speed than the general actuator.

Further, the servo actuator may be automatically controlled by a servo valve which is provided in the body.

That is, the servo actuator may brake or drive the rod, which is progressed in the stroke direction at a rapid speed, using the automatic control of the servo valve, thereby applying the accelerating force having an accurate size.

In this case, the rotation servo actuator 120 is on the upper surface of the basic part 100 to be parallel with a direction in which it applies the accelerating force and the rotating part 220 may include a pair of rails 130 along which the rotating part 200 moves.

That is, the rotating part 220 moves along the rail 130 by the shock by the accelerating force and the rotating part 220 is applied with the accelerating force from the rotation servo actuator 120 and includes a rotating part body 221 moving along the rail 130, rotating part body rails (not illustrated) formed at both ends of the upper portion of the rotating part body 221, rotation moving parts 222 formed on the rotating part body 221 in a half ring shape while being curved to face each other and formed to be movable in a circumferential direction by a predetermined distance while being fixed to the rotating part body rail, and a rotation moving cover part 223 formed on the upper surface of the rotation moving part 222 and connected to the body 200.

In other words, at the time of the simulation, the rotating part 220 applied with the accelerating force from the rotation servo actuator 120 moves along the rail 130 in the width direction of the body 200 by the applied acceleration force. In this case, the simulation situation by the rotation may be reproduced while the rotating part 220 moving along the rail 130 by the rotation moving part 222 formed to rotate.

Similar to the rotating part 220, the rotation center part 210 also rotates while moving in the width direction of the body 200 by the rotation center servo actuator 110.

That is, both of the rotation center part 200 and the rotating part 220 of the weight balancing type dynamic yawing simulator according to the exemplary embodiment of the present invention are applied with the accelerating force and thus rotate while moving in the width direction of the body 200, which is not a static yawing simulator fixing the position of the rotation center part 210 and rotating the other side of the body 200 but a dynamic yawing simulator in which the position of the rotation center part 210 is not fixed and the position of the central rotation shaft is changed and may reproduce various situations.

Further, both ends of the rotation moving part 222 may be further provided with rotation moving limiting parts (not illustrated) which limit the movement in the circumferential direction.

The rotation moving limiting part may be variously implemented like protective walls formed at both ends of the rotation moving part 222 and apparatuses controlling the movement by the rotation and therefore is not limited thereto.

The rotation moving limiting part limits the rotation of the rotation moving part 222 and thus the rotation moving part 222 limits a maximum rotation angle rotating on the rail 130, thereby preventing the rotation moving part 222 and the rail 130 from being broken and preventing the rotation moving part 222 from being separated from the rail 130.

The existing general simulator applies an accelerating force toward one side and thus the weight of the simulator moving in one direction leans, such that a tested part may be separated from the body or damaged.

Therefore, the weight balancing type dynamic yawing simulator according to the exemplary embodiment of the present invention includes a weight balancing part 140 to prevent a weight from leaning in one direction to reproduce the simulation situation.

The weight balancing part 140 is formed at the other side of the basic part 100 to be movable in the width direction of the body 200, and as illustrated in FIG. 6, includes a weight balancing fixed part 141 fixed on the upper surface of the basic part 100, a weight balancing fixed shaft 142 including a weight balancing rod 142-1 formed to be connected to the weight balancing fixed part 141 in the width direction of the body 200 and a weight balancing piston 142-2 formed to be connected to the weight balancing rod 142-1, and a weight balancing body 143 formed to enclose the weight balancing fixed shaft 142.

In this case, the weight balancing body 143 is formed to be stroke-driven in the width direction of the body 200 by an air pressure.

In other words, the weight balancing part 140 is a pneumatic cylinder, in which the general cylinder is fixed with a body and the piston and the rod are stroke-driven. On the other hand, the weight balancing part 140 according to the exemplary embodiment of the present invention is fixed with the weight balancing fixed shaft 142 and the weight balancing body 143 moves by the air pressure supplied from the servo valve, etc.

Describing in more detail, the body 200 applied with the accelerating force from the rotation center servo actuator 110 and the rotation servo actuator 120 moves and rotates in the width direction (direction opposite to the direction in which the accelerating force is applied) of the body 200. In this case, the body 200 moves in one direction and thus the phenomenon that the weight balancing leans to one direction occurs, such that the body 200 may be separated from the basic part 100 or may be damaged.

Therefore, in the weight balancing type dynamic yawing simulator according to the exemplary embodiment of the present invention, when the body 200 is applied with the accelerating force to rotate and move in any one direction, the weight balancing body 143 of the weight balancing part 140 moves in an opposite to the direction in which the body 200 moves, thereby suppressing the phenomenon that the weight leans.

In this case, the weight balancing part 140 may be configured to further include the weight balancing rod 142-1 moving at a rapid speed and a cushion part 145 provided with a cushion ring to prevent the shock on the weight balancing body 143 by the weight balancing piston 142-2.

As illustrated in FIG. 7, the cushion part 145 may include a parabolic cushion ring type, a pierced cushion ring type etc. but is not limited thereto and therefore the cushion ring having various shapes may be possible.

Further, the weight balancing body 143 may be separated or damaged due to the shock generated while the body 200 moving and rotating at a rapid speed, and therefore the upper portion of the basic part 100 may be further provided with the weight balancing rail 144 along which the weight balancing body 143 moves in the width direction of the body 200.

To offset the accelerating force and the weight of the body 200 moving and rotating at a rapid speed, the weight balancing rail 144 is made of a heavy material. Therefore, the weight balancing rail 144 is made of a heavy material and thus the weight balancing body 143 made of a heavy material may smoothly move.

Further, the weight balancing rail 144 for moving the weight balancing body 143 is not limited to the configuration illustrated in the drawing and therefore various embodiments may be possible.

In the weight balancing type dynamic yawing simulator according to the exemplary embodiment of the present invention, the rotating part 220 is highly likely to be damaged due to the shock by the accelerating force applied from the rotation center servo actuator 110 and the rotation servo actuator 120 and the shock by the weight balancing part 140 moving the weight in the direction opposite thereto, which is difficult to prepare for the shock only by the movement on the rail 130.

Therefore, the weight balancing type dynamic yawing simulator according to the exemplary embodiment of the present invention may further include a buffer member 150 which is formed on the upper surface of the basic part 100 in the width direction of the body 200 and is formed to contact the rotating part 220.

The buffer member 150 serves to prevent the rotating part 220 from being damaged from the body 200 moving and rotating at a rapid speed or from being separated on the rail 130 due to the shock by the rotation center servo actuator 110 and the rotation servo actuator 120.

Further, the buffer member 150 is not limited to the configuration illustrated in the drawing and various embodiments of materials and formation positions may be possible.

Further, the weight balancing type dynamic yawing simulator according to the exemplary embodiment of the present invention may include an actuator pneumatic supplier 160 which is formed on the upper surface of the basic part 100 and supplies an air pressure to the rotation center servo actuator 110 and the rotation servo actuator 120 and may further include a weight balancing pneumatic supplier 170 which is formed on the upper surface of the basic part 100 and supplies an air pressure to the weight balancing part 140.

Further, the actuator pneumatic supplier 160 and the weight balancing pneumatic supplier 170 are not limited to one illustrated in the drawing and various embodiments of a shape, a material, and a position may be possible.

Further, the weight balancing type dynamic yawing simulator according to the exemplary embodiment of the present invention may include an accelerator sensor (not illustrated) which is installed at one end of the rod of the rotation center servo actuator 110 and one end of the rod of the rotation servo actuator 120.

The acceleration sensor which is installed at one end of the rod of the rotation center servo actuator 110 and one end of the rod of the rotation servo actuator 120 measures and controls the speed and the acceleration of the weight balancing type dynamic yawing simulator according to the exemplary embodiment of the present invention, thereby accurately applying an acceleration to the rotation center part 210 and the rotating part 220.

According to the weight balancing type dynamic yawing simulator according to the exemplary embodiment of the present invention, it is possible to reproduce the situations like the real crash situations by providing the simulator capable of reproducing the crash results of the side direction and the yawing to the existing simulator capable of reproducing the crash results of the front direction, the pitching, and the vertical direction of the vehicle in a vehicle crash simulator.

In particular, according to the weight balancing type dynamic yawing simulator according to the exemplary embodiment of the present invention, it is possible to help develop the passenger safety apparatuses such as the seat and the seat belt by verifying the strength of injury due to the shock by reproducing the crash results of the side direction and the yawing.

According to the weight balancing type dynamic yawing simulator according to the exemplary embodiment of the present invention, it is possible to reproduce the crash results by being applied to the vehicle crash field and various fields such as vehicle parts crash, a building structure, and a ship.

According to the weight balancing type dynamic yawing simulator according to the exemplary embodiment of the present invention, it is possible to prevent the test apparatus from being separated or broken due to the weight concentration in one direction due to the crash test in the vehicle crash simulator.

What is claimed is:

1. A weight balancing type dynamic yawing simulator, comprising:
    a basic part formed at a lower portion thereof; and
    a body formed at an upper portion of the basic part and moving and rotating by an external shock,
    wherein the body includes:
    a rotation center part configured to be formed on a lower surface of the body and spaced apart from one side in a length direction of the body at a predetermined distance;
    a rotating part spaced apart from the rotation center part toward the other side in the length direction of the body at a predetermined distance; and
    a moving part configured to be formed at one side of the body and move on the basic part, and
    wherein the basic part includes:
    a rotation center servo actuator configured to be formed at one side of the upper portion of the basic part and apply an accelerating force to the rotation center part in a width direction of the body; and
    a rotation servo actuator configured to be spaced apart from the rotation center servo actuator toward the other side in a length direction of the basic part at a predetermined distance and apply an accelerating force to the rotating part in the width direction of the body.

2. The weight balancing type dynamic yawing simulator of claim 1, wherein the basic part further includes:
    a pair of rails configured to be formed on an upper surface of the basic part to be parallel with a direction in which the rotation servo actuator applies the accelerating force and have the rotating part moving therealong.

3. The weight balancing type dynamic yawing simulator of claim 2, wherein the rotating part includes:
    a rotating part body configured to be applied with the accelerating force from the rotation servo actuator and move along the rail;
    a rotating part body rail configured to be formed at both ends of an upper portion of the rotating part body;
    rotation moving parts configured to be formed on the rotating part body in a half ring shape while being curved to face each other and to be movable in a circumferential direction by a predetermined distance while being fixed to the rotating part body rail; and
    a rotation moving cover part configured to be formed on an upper surface of the rotation moving part and be connected to the body.

4. The weight balancing type dynamic yawing simulator of claim 3, wherein the rotation moving part includes rotation moving limiting parts provided at both ends thereof to limit a movement in the circumferential direction.

5. The weight balancing type dynamic yawing simulator of claim 1, wherein the basic part further includes a weight balancing part configured to be formed on the other side of the basic part to be movable in the width direction of the body.

6. The weight balancing type dynamic yawing simulator of claim 5, wherein the weight balancing part includes:
    a weight balancing fixed part configured to be fixed on an upper surface of the basic part;
    a weight balancing fixed shaft configured to include a weight balancing rod formed to be connected to the weight balancing fixed part in the width direction of the body and a weight balancing piston formed to be connected to the weight balancing rod; and
    a weight balancing body configured to enclose the weight balancing fixed shaft, and
    the weight balancing body is formed to be stroke-driven in the width direction of the body by an air pressure.

7. The weight balancing type dynamic yawing simulator of claim 6, wherein the basic part further includes a weight balancing rail configured to be formed on the upper portion of the basic part in the width direction of the body and have the weight balancing body moving therealong.

8. The weight balancing type dynamic yawing simulator of claim 5, further comprising:
   a weight balancing pneumatic supplier configured to be formed on an upper surface of the basic part and supply an air pressure to the weight balancing part.

9. The weight balancing type dynamic yawing simulator of claim 1, wherein the basic part further includes a buffer member configured to be formed on an upper surface of the basic part in the width direction of the body and formed to contact the rotating part.

10. The weight balancing type dynamic yawing simulator of claim 1, further comprising:
   an actuator pneumatic supplier configured to be formed on an upper surface of the basic part and supply an air pressure to the rotation center servo actuator and the rotation servo actuator.

* * * * *